A. M. BULLARD AND J. N. REYNOLDS.
M. R. BULLARD, ADMINISTRATRIX OF A. M. BULLARD, DEC'D.
CONTROLLING SYSTEM FOR AUTOMATIC SWITCHING SYSTEMS.
APPLICATION FILED JAN. 7, 1915.

1,386,686.

Patented Aug. 9, 1921.
7 SHEETS—SHEET 1.

Witnesses:

Inventors:
Marion R. Bullard
administratrix of the estate of
Albert M. Bullard.
and John N. Reynolds
by _____ Att'y A. M. BULLARD AND J. N. REYNOLDS.
M. R. BULLARD, ADMINISTRATRIX OF A. M. BULLARD, DEC'D,
CONTROLLING SYSTEM FOR AUTOMATIC SWITCHING SYSTEMS.
APPLICATION FILED JAN. 7, 1915.

1,386,686.

Patented Aug. 9, 1921.

Fig. 6.

Witnesses:
O. D. M. Guthe,
Ph. R. Rossi.

Inventors:
Marion R. Bullard
administratrix of the estate of
Albert M. Bullard.
and John N. Reynolds
by _____, Att'y

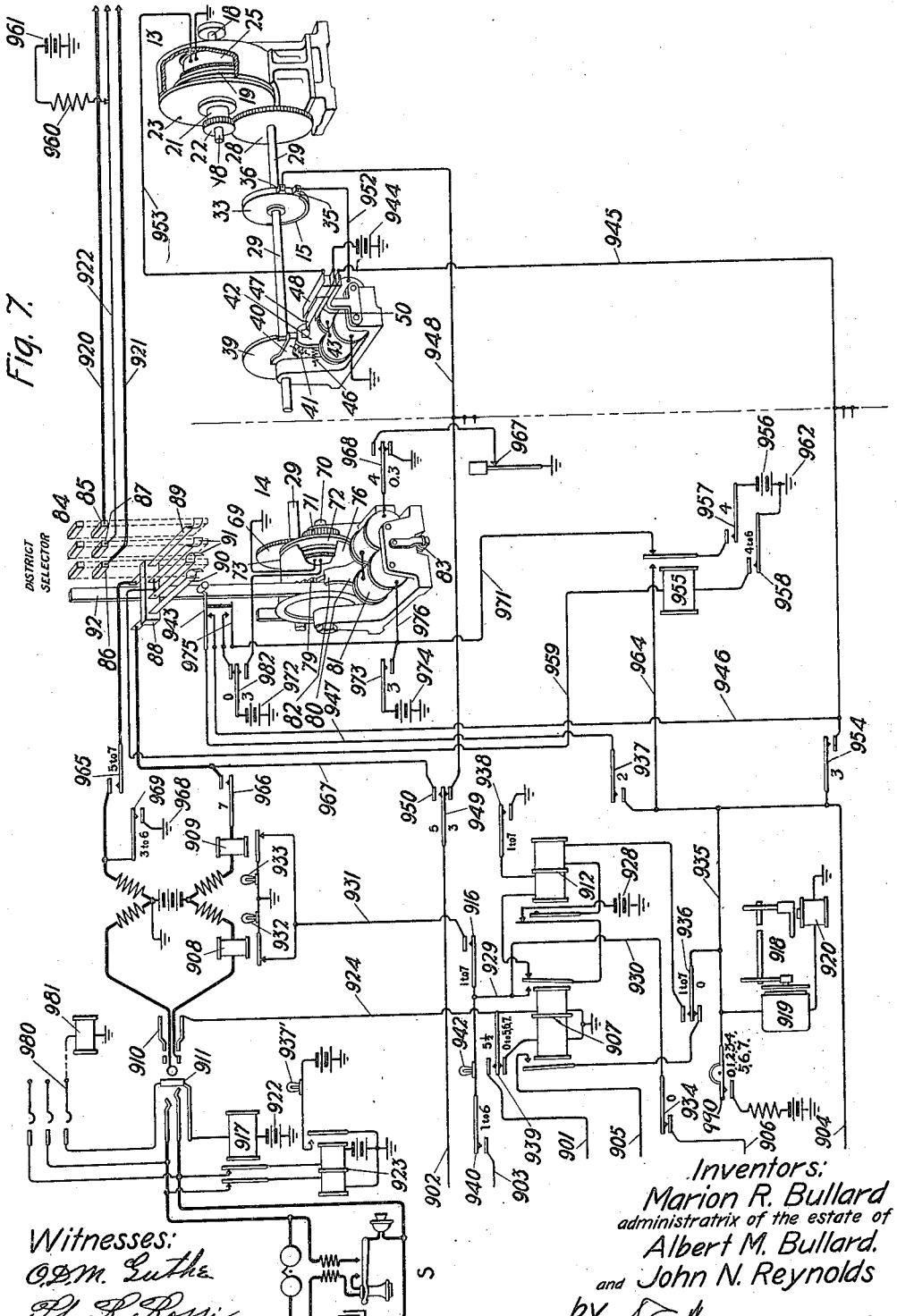

UNITED STATES PATENT OFFICE.

ALBERT M. BULLARD, DECEASED, BY MARION R. BULLARD, ADMINISTRATRIX, OF WOODSTOCK, NEW YORK, AND JOHN N. REYNOLDS, OF GREENWICH, CONNECTICUT, ASSIGNORS, BY MESNE ASSIGNMENTS, TO WESTERN ELECTRIC COMPANY, INCORPORATED, A CORPORATION OF NEW YORK.

CONTROLLING SYSTEM FOR AUTOMATIC SWITCHING SYSTEMS.

1,386,686.     Specification of Letters Patent.     Patented Aug. 9, 1921.

Application filed January 7, 1915. Serial No. 891.

*To all whom it may concern:*

Be it known that we, MARION R. BULLARD, administratrix, residing at Woodstock, in the county of Ulster and State of New York, and JOHN NEWBERRY REYNOLDS, residing at Greenwich, in the county of Fairfield and State of Connecticut, citizens of the United States, are in possession of an invention in a certain new and useful Improvement in Controlling Systems for Automatic Switching Systems, invented by ALBERT M. BULLARD, deceased, and the said JOHN NEWBERRY REYNOLDS, of which the following is a full, clear, concise, and exact description.

This invention relates to telephone exchange systems of the automatic or semi-automatic type in which the selection of lines or trunks for the extension of the telephone transmission circuits is accomplished by mechanical selector switches, the object being to provide an improved arrangement of circuits and apparatus whereby the desired call may be accurately and speedily recorded and stored in such manner that the subsequent movements of the selective mechanisms may be controlled and governed in an accurate and efficient manner.

One feature of the invention is concerned with the provision of simple, efficient and economical means for operating a series of combined recording and controlling devices by means of which the call may be quickly stored by the operation of a single set of office keys and a single row of digits keys.

In large automatic systems designed to accommodate many lines, the number of selecting switches necessary to accomplish selection increases rapidly as the number of offices and lines increasses, and it is necessary therefore to provide suitable means for controlling the movements of the chain of selection switches required in order to complete the connection of a telephone transmission circuit. And it is therefore one of the features of this invention to provide means by which a series of controlling devices, upon which a call has been recorded, may be brought into operation at the proper time and in such sequence that the advance of the distant selector brushes will be governed efficiently and accurately.

Where a number of selectors are required to be operated in sequence in making a connection, a certain definite time is required to complete the operations which is considerably more than is required to operate the keys in setting up the desired number, because of the skill and proficiency acquired by the operators. For this reason it becomes desirable in a system of this kind to provide more than one set of storing devices with suitable means for bringing them into connection with the keyboard at the proper time and in the proper order. It should be noted that means for accomplishing this result have been made a feature of this invention.

In a system involving such features, particularly where the selector switches used are of the clutch controlled type, the transmission from one selection to the next should be accomplished without the release of the selector switch, and this invention therefore provides means in connection with a sender device having a plurality of call register controller mechanisms whereby the selection governed by one controller mechanism may be completed and the selection governed by another controller mechanism instituted without the release of the selector controlling clutch and without the release of the selector mechanism.

This invention also involves certain details of construction and organization of the circuits and apparatus by which all of the operations incidental to the proper establishment of connections may be accomplished.

For the purpose of clearly setting forth the invention, it is described and shown in connection with mechanical selector switches of what is known as the panel type and in connection with other specific mechanisms and arrangements of circuits, but it must be understood that this invention is not limited to such switches, mechanisms or circuits further than is specifically indicated in the claims appended hereto.

This invention as illustrated on the accompanying drawings comprises a single set of office keys and a single set of ten digits keys. Operating in connection with this key equipment there are provided two groups of sending mechanisms hereinafter referred to as controllers, each group composed of eight recording and controlling mechanisms and one progressive switch, the latter being employed for the purpose of bringing each of the several controllers into electrical relation with the keys in the proper sequence and at the proper time. For the purpose of bringing the proper group of sending mechanisms, hereinafter termed the sender, into electrical relation with the keys, there is provided a shifter switch arranged with two positions.

The drawings, Figures No. 1 to No. 7 inclusive, illustrate the invention in connection with a single selector and the sender in which provision has been made for two sets of controllers, the selector being one by which it is desired to select an idle trunk to a further selector.

In the drawings—

Figure 5:
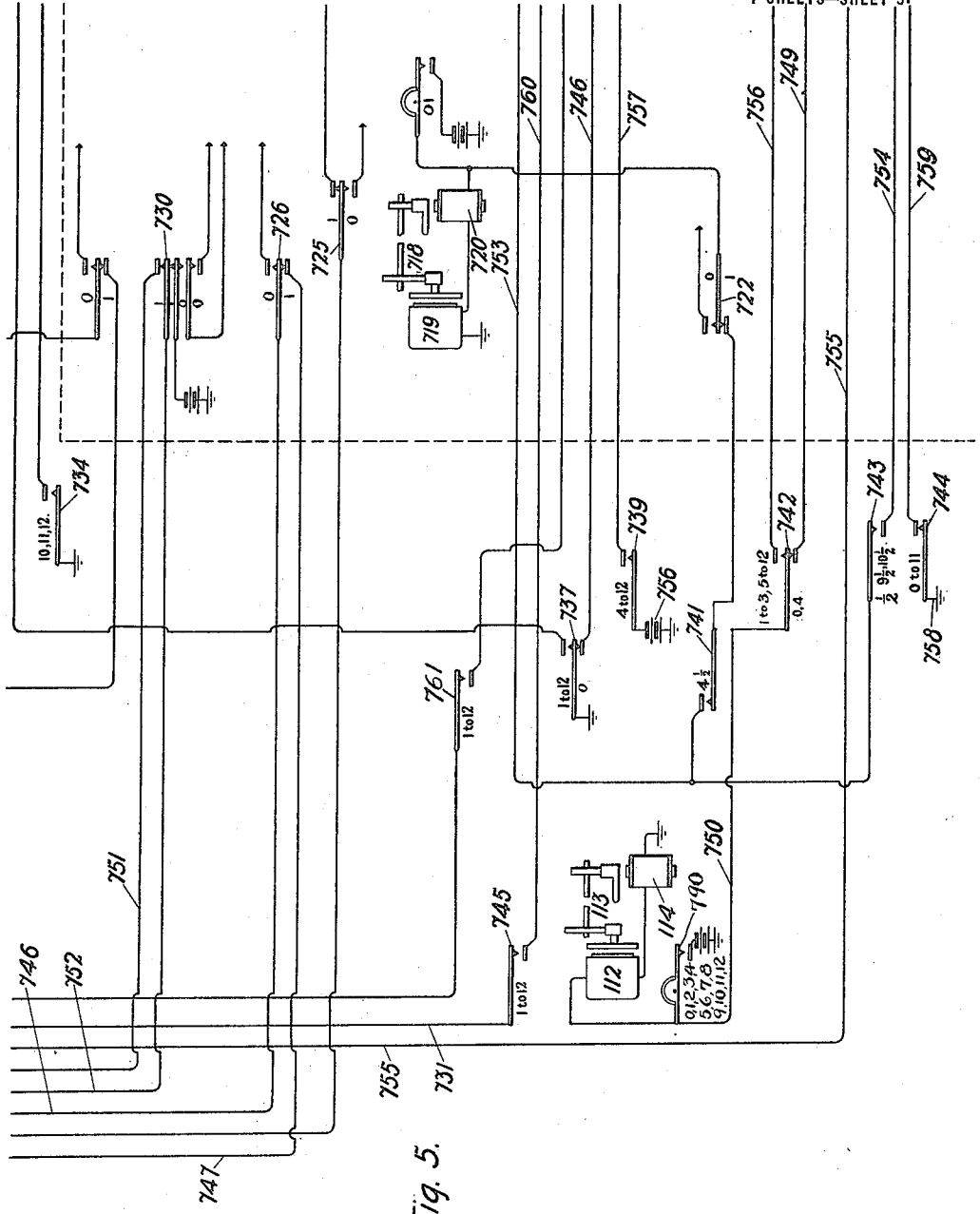

Fig. 5, to the left of the dotted division, shows various sequence switch contacts which are associated with the controller circuit. To the right of the dotted division line, there is shown the cord finder shifter switch;

Fig. 6 shows a group of the several more important relays associated with the group of controllers and also the cord finder;

Fig. 7 shows the calling line with the answering jack, the answering jack plug and cord circuit, and the calling circuit and mechanism associated with the district selector.

Selector.

The selector in connection with which this invention is illustrated is shown partly diagrammatically and partly in perspective in Fig. 7. It is of the master and individual type of mechanism arranged to be operated on what is known as the panel form of selector multiple. This multiple consists preferably of strips of metal having contact points spaced at regular intervals along their entire length. These strips are placed one upon another with strips of insulating material between, in such manner as to form vertical banks of contacts over which the selector brushes may be moved in a vertical direction. The selector may comprise any desired number of sets of contacts. These may be divided and subdivided into groups as preferred. As herein described, however, the selector is considered as accommodating contacts forming the terminals of 100 trunk lines, these 100 trunk lines being divided into four main divisions of 25 lines each, the terminals of which form a group and are herein considered as leading to apparatus having similar functions, so that each of the lines of a group will equally well serve for the connection desired. It should be understood, however, the invention herein described is not limited in its application to this form of selector. A selector similar to the one herein described is disclosed in Patent No. 1,020,185.

In Fig. 7 the banks of contacts referred to are indicated generally at 84. The set of contacts 85, 86 and 87 form respectively the transmission and test terminals of the trunk line 920 and 921 leading to a further selector. The brush carrier 88 carries the brushes 89 and 90 arranged to contact respectively with the terminals 85 and 86, and the brushes 91 arranged to contact with the test terminal 87. This brush carrier is carried by a metallic tape 92 passing around the sheave 76 of the driving mechanism individual to the selector, and also over the top of an idler pulley not here shown. This tape, when moved by the rotation of the sheave 76, carries the brushes into position to make contact with the terminals 85, 86 and 87 of the desired line, the selection being determined by the extent of the movement of the tape, the control of which will be hereinafter more specifically described.

Briefly considered, selection is accomplished by moving the brush carrier, which normally stands at the bottom of the first group of contact terminals, at a relatively high rate of speed to the top of the group in which the terminals of the desired line are located. The group having thus been selected, the particular set of terminals in such group is selected by a downward step-by-step movement of the brush carrier, which downward movement may be under the control of a sender or may be an automatic search for an idle line as is herein illustrated.

The driving mechanism by which power is supplied for moving the brush carrier 88 is shown in Fig. 7 by the master clutch mechanism 13 common to a plurality of selectors. The individual clutch mechanism 14 is also shown associated with the master mechanism 13. The master clutch mechanism 13 comprises a power shaft 18 at one end of which is a disk 19. Adjacent to the disk 19 is the disk 23 mounted on the sleeve 21, to one end of which there is attached the gear wheel 22. The disk 23, of soft iron, or other magnetic material, forms the armature of the electromagnet 25. The disk 19, of brass or other non-magnetic material, is provided with a friction surface arranged to oppose and coöperate with a friction surface upon the armature 23, and when the electromagnet 25 is energized it attracts the disk 23 and brings the disks 19 and 23 into intimate frictional contact, causing the rotation of disk 23. The gear wheel 22 meshes with the gear wheel 28 which is pinned to shaft 29. Upon the shaft 29 there is mounted the commutator 33, which coöperates with the contacts 35 and 36 and serves to make and break the circuit between these contacts once for every revolution of the shaft 29. The disk 39, also mounted on shaft 29, has coöperating therewith the arm 40 mounted loosely upon the shaft 29 and held in particular relation to the disk 39 by the spring 41 whose ends are fastened to the disk 39 and the arm 40. The arm 40 coöperates with armature 42 of the stop magnet 43 to stop the rotation of the disk 39 when the magnet 43 has been deenergized but to permit a slight overrun by the disk 39 due to the expansion of the spring 41, which overrun will, however, be corrected and the disk 39 brought back into proper position by the contraction of the spring 41. The armature 42 which is normally in a retracted position, due to the tension of the spring 46, operates when attracted to open contacts 47 and 50 and to close contacts 47 and 48.

Individual driving mechanism.

The individual driving mechanism comprises a shaft 70 to one end of which is affixed the gear wheel 71 which meshes with the gear wheel 69 upon the driving shaft 29. Adjacent to the gear wheel 71, and also fixed to the shaft 70 is a disk 72 of soft iron or other magnetic material, which forms the aramture of the electromagnet 73, which when energized attracts the disk 72 to move the shaft 70 to lock the sheave 76, around which the metallic tape 92 passes, to the gear 71 as fully described in the above mentioned patent.

The inner rim of the sheave 76 is made to form a ratchet by having cut therein the teeth 79. Coöperating with these teeth 79 is the armature 80 of the electromagnet 81 by the energization of which the armature is attracted to remove the projecting piece 82 upon the armature 80 out of operative engagemnt with the teeth 79. The armature 80 is normally held retracted and the projecting piece is held in engagement with the teeth 79 by the spring 83.

The movement of the shave 76, therefore, depends upon the energization of the clutch magnet 73 and the rotation of the shaft 29. The shaft 29, however, having moved the sheave and tape into any given pisition, they may be prevented from returning by the projection 82 upon the armature 80 under the control of the release magnet 81.

Sequence switches.

To control the various circuits which must be established in definite order at successive stages of the operation, to bring into service different devices or parts as desired, there are used automatic switching appliances which are termed "sequence switches." There is a sequence switch associated with the sender mechanism, a sequence switch associated with the cord finder and a sequence switch associated with each individual driving mechanism as is indicated on Figs. 2 to 7 of the drawings. These sequence switches each consist of a movable switch operating member, a number of circuit changes being made as said member is moved from one position to another; an electromagnet and a constantly rotating source of power, the connection of which with the movable member is controlled by said magnet for advancing said movable member. The sequence switch mechanism herein shown may be the same as that shown and described in the above mentioned patent, although any similar device will serve equally well the requirements of this invention.

In Figs. 1 to 7 which compose a full diagrammatic showing of the invention, the switch springs of the sequence switches are not shown in their actual arrangement, but are so located as to give a clear arrangement of the circuits, the operating cam wheels not being shown. The positions of the rotary element of each sequence switch in which any of its contacts, except the special controlling contacts, are closed are indicated by the numbers placed adjacent to such contacts; each contact being open in all positions except those indicated by such numbers. The special contacts referred to are indicated by a special convention and are placed close to the sequence switches respectively controlled by them. These special contacts are closed while the rotary element of the switch is in transit between the positions indicated, and are open in the positions indicated to permt their respective sequence switches to come to rest in the positions so indicated.

Controllers.

In a semi-automatic telephone exchange system, an operator at a central office may be provided with keys and controlling apparatus asociated therewith, so arranged that switching appliances or selectors will be governed thereby to extend a connection from a calling line to a called or wanted line, the operation of the selectors being determined according to the particular keys actuated. In the particular form of controlling device employed in this system, the contacts or terminals are wired to the corresponding keys, and a finder brush is arranged to traverse the said terminals, and means are provided to cause the brush to be stopped at that contact connected to an operated key.

In the form of mechanism shown with this system, means are provided whereby the actuation of any key of a series causes the finder brush of the controller to move directly and rapidly to the selected point and there be stopped abruptly and with precision. After reaching the selected point, the stepping magnet associated with the controller arm may be cut into the selecting circuit and the controller arm allowed to return step by step to its normal position. The extent of travel in this latter movement will determine the operation of the distant switching mechanism. The first or registering action of the controller will take place independently of the selector to be controlled, but in the sending or controlling operation, the selector and the finder brush of the controlling device will be caused to operate in unison, by the application of current impulses to the selecting circuit, until the finder brush of the controlling mechanism reaches its normal position, whereupon both controller and selector are stopped, the movement of the selector being thus predetermined by the extent of movement of the finder brush, i. e., by the key depressed.

Figure 2:
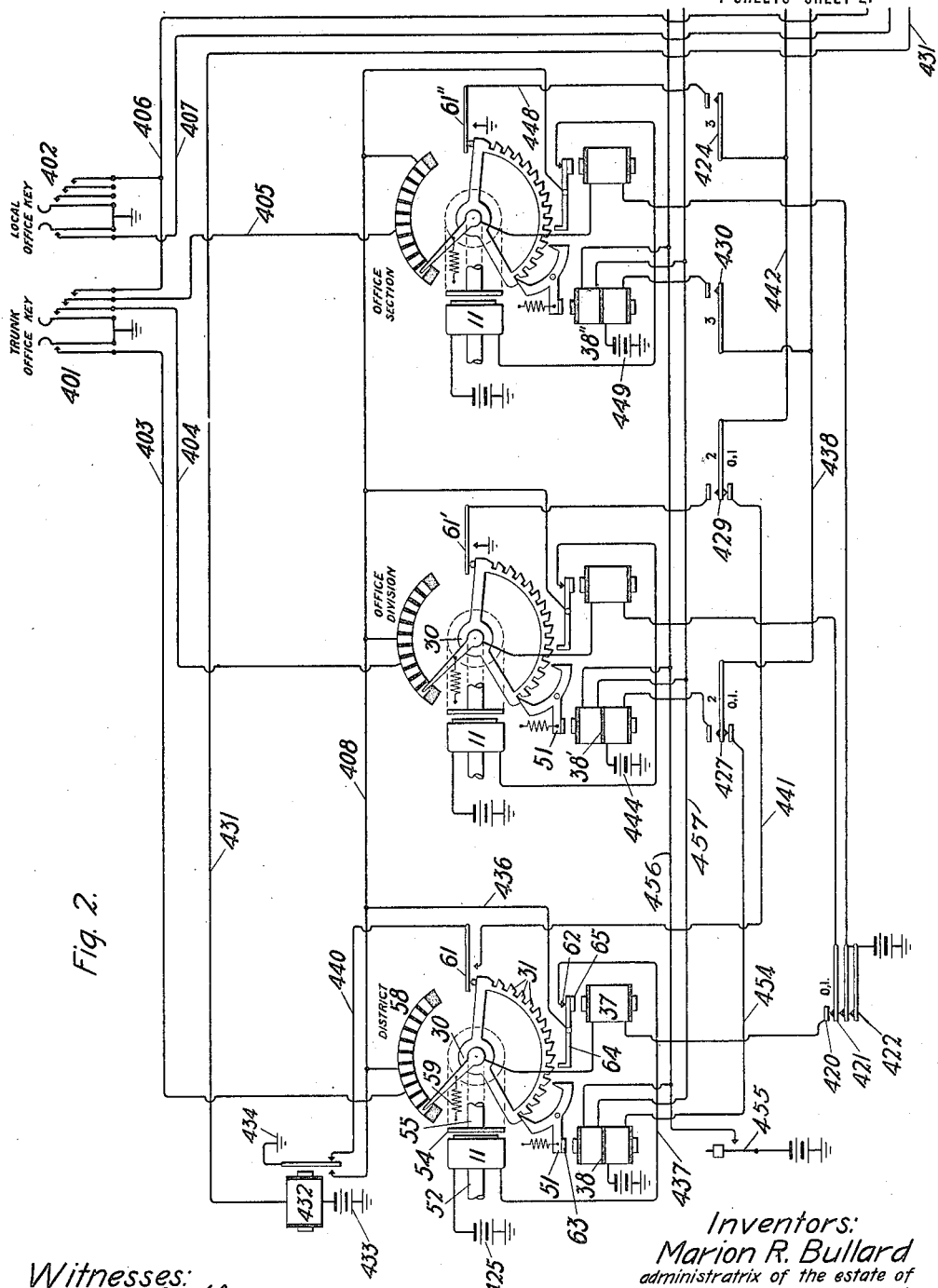
Fig. 2 shows the office keys, the district controller, the office division controller, and the office section controller.

Referring now to the "distinct controller" shown at the left in Fig. 2, 52 and 55 represent rotatable members, the former, which is hereinafter referred to as the driving member, being adapted to be connected to a source of power in any desired manner. Between said members, a connecting mechanism, preferably an electromagnetic clutch is provided. This clutch comprises the electromagnet 11 surrounding the power shaft, and the iron plate or armature 54 mounted on the member 55.

The controller brush 30, which is hereinafter referred to as the driven member, is secured to the member 54 and is caused to traverse the series of contact terminals 58 when the magnet 11 is energized.

A segmental ratchet carried on the shaft 55 is provided with a series of teeth 31. The spring 59, secured at one end to the frame and at the other to the ratchet, provides restoring means for the driven member 30. A magnet 37 is provided with an armature 65 carried on a stop pawl 64, adapted, when the electromagnet is energized, to engage one of the teeth 31 and stop the driven member 30 in whatever position it may be at the instant. An electromagnet 38 is provided with an armature 63, carried by the lever of the escapement 51, adapted to engage the teeth 31 when said armature operates in response to impulses received from the distant selector in its advance to the desired line. Two switches are provided, one of which comprises springs 61 normally held apart by an insulating stud carried by the ratchet, and the other of which comprises the normally closed contact 62 adapted to be opened when magnet 37 is energized.

It is believed that the structure and operation of the progression switch and the cord finder will be readily understood from the description of their operation in the circuits. The driving means for the cord finder is similar to that of the sequence switches and controllers just described; i. e., the energization of its clutch magnet causes the movable member to be fixed to the power shaft, shown as extending through the clutch magnet, to rotate therewith. The movable member of the progression switch is rotated in a clockwise direction to its set position by the attraction of its armature 524, fixed to the supporting shaft, by the magnets 525, and is returned step-by-step under control of the escapement magnet 559. The operation of this controlling device and the operation of making a selection will be hereinafter more fully described.

*Operation general.*

In this system, for the purpose of economy, each selector is preferably arranged to have direct access to a large number of lines. While the lines of an exchange are designated by numerals of the decimal system, the actual grouping of these lines is more economical if the decimal system is not followed. For example, in the system shown, the group selectors and final selectors are 500 line machines. Each set of stationary terminals on the group selector represents a final selector which can reach 500 subscribers' lines. In an exchange office serving 10,000 lines, the final selectors may be divided into twenty groups, one group for each 500 lines. The 500 sets of terminals of the group selector may be divided into five main divisions of one hundred each; these being sub-divided into four subsidiary groups of twenty-five each. Each of the twenty-five final selectors, represented by the terminals in any main division of the group selector, will have direct access to the same five hundred subscribers' lines.

In order to extend a connection from a calling line in one office to a group selector at a distant office in which the called line is located, the district selector, used with the operator's connecting circuit, chooses an idle office selector which is represented as a five hundred line machine, divided into five main divisions of one hundred lines each, these being again sub-divided into ten subsidiary groups of ten lines each. These subsidiary groups of terminals of the office selector will be connected to trunks leading to group selectors at distant offices. In this system, as the group of trunks and lines does not follow the decimal system, it is evident that the selecting impulses transmitted by the sending apparatus cannot correspond in all cases to the digits of the number of the line wanted. The sending apparatus is, therefore, provided with means to "translate" the numerical indication of the keys into the desired sequence of impulses, not necessarily following the decimal system, but adapted to the particular grouping of the apparatus to be controlled. It is not necessary, in all cases, that the separate divisions of the translated impulses be governed by separate controllers, as means may be provided for translating the combination indicated by the main set of keys into an equivalent combination for governing the selecting apparatus upon another basis. Thus, in some cases, translation may be secured by inter-wiring between the keys and controllers. This is done in connection with the office keys and the district and office selectors. The actuation of a single key may determine not only the operation of a single controller but the operation of a number of controllers, so that a single key may thus control the whole sequence of operations according to a predetermined plan. In order that a group selector at a particular office may extend a connection from its incoming trunk to any one of the ten thousand lines of that exchange, selection will proceed as follows:

First, one of the main groups of one hundred terminals of the group selector will be chosen, according to which large group of two thousand lines contains the one desired. Choice is then made of that one of the four subsidiary groups of this main division, whose terminals represent the twenty five final selectors having access to the group of five hundred lines in which the desired line is located. The terminals representing these twenty five final selectors are now tested in rotation and connection made to the first one found idle. Now, having reached the required final selector, whose brushes have access to the five hundred lines in which the desired line is located, one of its main divisions is first chosen to reach the required hundreds zone. Then one of the subsidiary groups of ten lines is selected to reach the required tens zone and finally the desired line is selected by unit selection in this group of tens.

*Operation of the circuits.*

Figure 3:
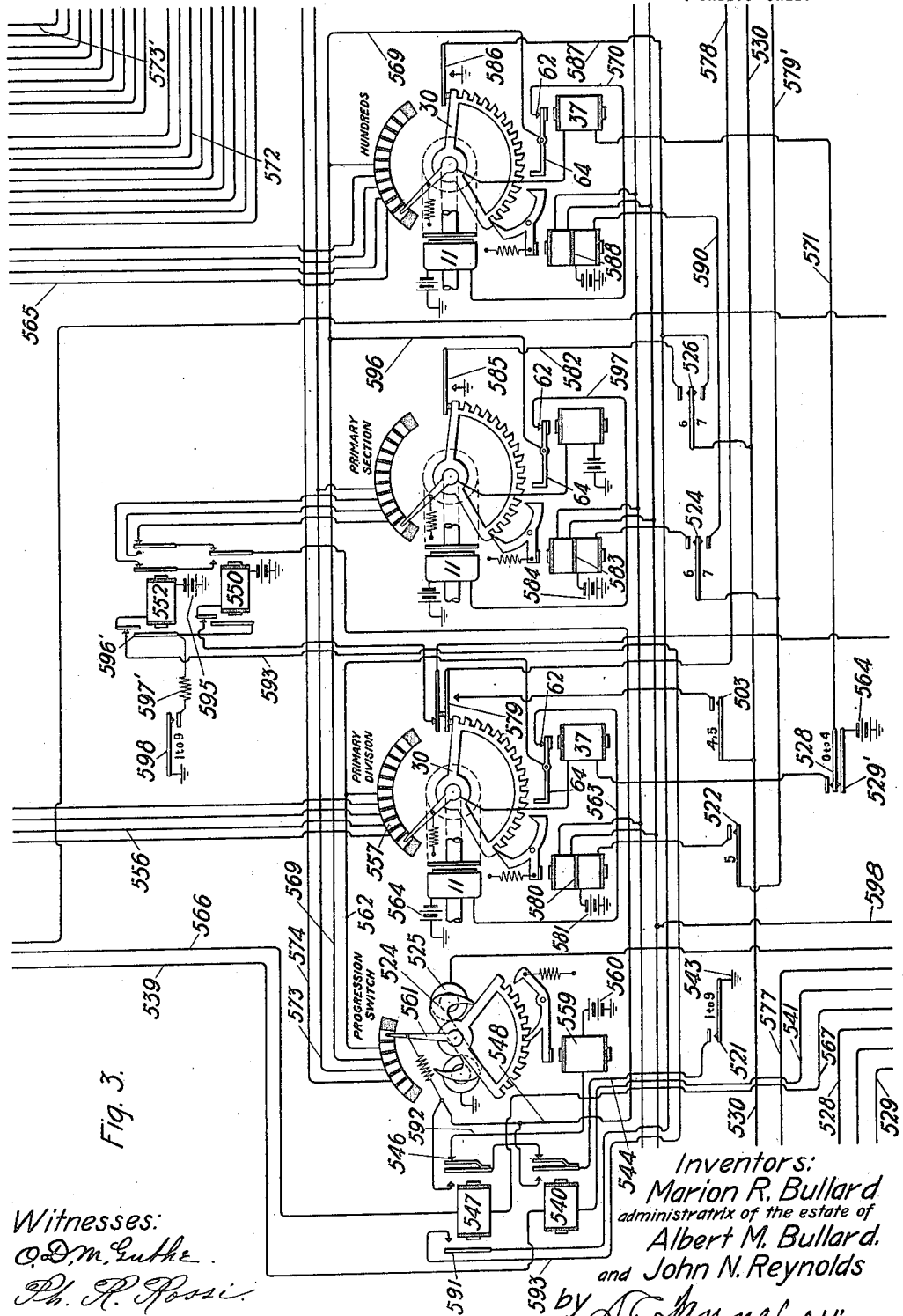
Fig. 3 shows the progression switch, the primary division controller, the primary section controller, and the hundreds controller.
Figure 4:
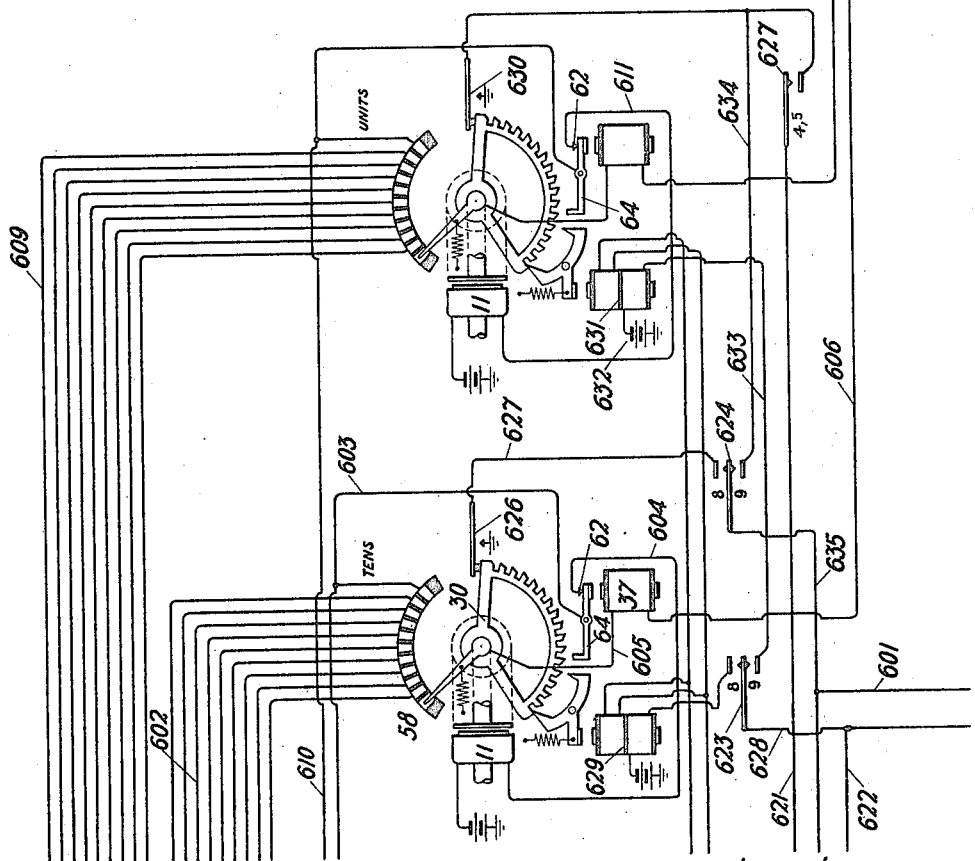
Fig. 4 shows the tens controller and the units controller.

Before entering into a detailed description of the circuits, it may be well to note that all the sequence switch contacts shown in Figs. 2, 3, 4 and at the left of the dotted line in Fig. 5, are controlled by the sequence switch 113 shown at the left in Fig. 5; that those shown in Fig. 6 and at the right of the dotted line in Fig. 5 are controlled by sequence switch 718 appearing at the right in Fig. 5, and that those appearing on Fig. 7 are controlled by the sequence switch 918 shown in the lower left corner of said figure.

The several arrow-ended conductors shown at the right of the dotted line in Fig. 5 will in practice extend to conductors, associated with another controlling device, corresponding to the conductors associated with the controlling apparatus shown in the drawings.

Figure 1:
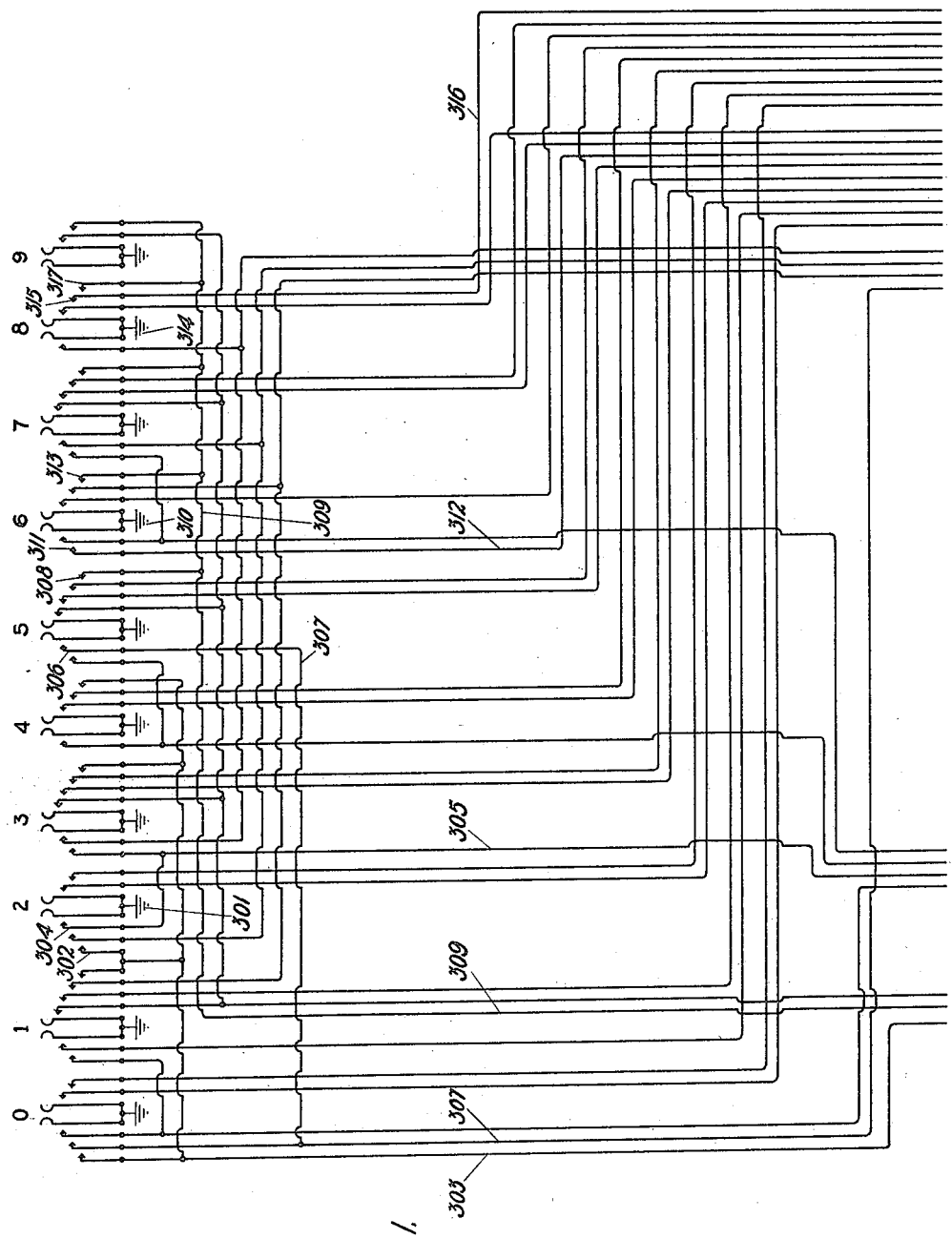
Fig. 1 shows the arrangement of the digit keys.

The various figures of the drawings should be arranged with Fig. 1 at the top, Fig. 3 below Fig. 1, Fig. 2 to the left and Fig. 4 to the right of Fig. 3, Figs. 5 and 6 below Figs. 3 and 4 respectively, and Fig. 7 at the right of Fig. 6.

When the subscriber S takes his receiver off the hook, the line lamp $937^1$ is lighted by the operation of the line relay 923, the operator responds by plugging into the answering jack 911 with the answering plug 910 of an idle cord circuit, allowing current to flow through the following circuit: battery 922, cut-off relay 917, sleeve of the answering jack 911, the sleeve of the plug 910, wire 924, low resistance right winding and high resistance left winding of relay 907 to ground. Relays 917 and 907 both operate, relay 917 cutting off the line relay 923 and extinguishing the calling lamp, and relay 907 completing the circuit from the battery 928, back contact of relay 912, right front contact of relay 907 to the feed wire 929. Current from the feed wire 929 passes through wire 930 and sequence switch contact 934, lead 906, lead 806 of the finder, shifter switch contact 863, right contact of finder relay 818, and through finder stop magnet 820 to ground. Stop magnet 820 is energized, withdrawing the holding pawl from the ratchet teeth and energizing through contact 865 the operating clutch 819. This causes the arm carrying the finder brushes to pass in clockwise direction over the contacts in its hunt for the terminals of the calling cord circuit. District selector relay 907 has also wet a point on the test contact terminal of the cord finder corresponding to this particular cord circuit by means of the following circuit: ground at the district selector sequence switch 918, stop magnet 920, clutch 919, wire 935, lower sequence switch contact 936, left contact of relay 907, lead 905 to cord finder lead 805 and cord finder contact terminal 811. When the brush 816 of the hunting cord finder reaches contact terminal 811, the above circuit is completed through wire 865′ and right winding of stop relay 818 to battery 866. The latter relay operates, opening its right contact and causing the cord finder to come to rest on the terminals of this cord circuit. At this time, by means of the same circuit, the sequence switch 918 is caused to take one step from its zero or normal position to position 1 under the control of its special controlling contact 990. This cord circuit is now busy to the cord finders because, by the opening of lower sequence switch contact 936, there is no ground on test lead 905.

At position 1, sequence switch contact 916 closes to supply battery from the common lead 929, through wire 931 to the two supervisory lamps 932 and 933. Relay 908 is energized at this time and lamp 932 is not lighted. Relay 912 is provided for the purpose of returning the sequence switch 918 to normal if for any reason it should be desired to disconnect before the complete operation of said sequence switch. In case premature disconnection does occur, relay 907 will be released, allowing current to flow from battery 928 through left back contact of relay 912, right back contact of relay 907, left winding of relay 912, sequence switch contact 938 to ground.

This will energize relay 912 and it will be locked up through front contact and right winding, upper contact 936, wire 935, clutch magnet 919 and stop magnet 920 of sequence switch 918, thus causing the latter to operate until its zero position is reached, where upper contact 936 opens, stopping the forward movement of the switch and releasing relay 912. By the operation of relay 912 it is possible for the operator in case of premature disconnection to immediately replace the plug 910 in the answering jack 911, because of the fact that battery will be cut off from the sequence switch operating circuit at the back contact of relay 912 until the sequence switch has reached its normal position and is again in condition for a complete operation.

At position 1 the district selector cord circuit is in readiness for operation with whichever one of the two sender mechanisms has been picked up, this being dependent upon the position of the allotter shifter switch 718.

We will assume that in this case the shifter switch was in position to allow cord finder 817 and its corresponding sending mechanism to be placed in connection with the cord circuit now in use. Battery now flows from common lead 929 through the revertive call lamp 942, sequence switch contact 940, lead 903, cord finder lead 803, contact terminal 809, and brush 814, to the cord finder wire 867, contact 868, wire 869, contact 836 of relay 833, right winding of relay 823, wire 860, wire 746, lower sequence switch contact 737 to ground. This causes controller relay 823 to operate and lock through its inner right front contact to ground.

The circuit is now in readiness for the depression of the keys and the consequent displacement of the various controllers involved in setting up a connection.

On Fig. 2 there are two office keys shown: 401 for a trunk office and 402 for a local office. Let it be assumed that the call to be described is for a trunk office. Therefore, depressing key 401 places ground on wires 406, 528, 746 and lower contact 726, wires 747, 529 and 431, relay 432 to battery 433. Key 401 also places ground on appropriate contact terminals of the district controller, office division controller and office section controller by means of wires 403, 404 and 405. Relay 432 in operating, energizes the driving clutches and causes the displacement of the three controllers to the points determined by the operation of key 401 by means of the following circuits: ground 434, front contact of relay 432, wire 408, wire 436, the stop pawl 64 of district controller 58, back contact 62, wire 437, and clutch 11 to battery 425. This causes the arm 30 of the controller to be rotated in clockwise direction until the brush strikes the terminal connected with ground at the key 401 through wire 403. When this point is reached, battery flows through contacts 422, 421, 420 and stop magnet 37 to ground at key 401, causing it to operate and bring the controller to rest two steps from its normal position. In a similar manner the office division and office section controller are also displaced to the points determined by the key 401, i. e. three steps on the office division and four steps on the office section controllers. When these three controllers leave their normal positions the off normal contacts of each are closed. These off normal contacts are for the purpose of stopping the forward movement of the distant selector arm as the call is run off in a manner to be described hereinafter. When the office key is released, relay 432 is deënergized and at its back contact completes a circuit from ground, through wire 440, off normal contact 61, wire 441, lower sequence switch contact 429, wire 442, wire 530, wire 601, wire 870, and winding of relay 837 to battery 862. Relay 837 now operates and closes the following circuit for the operation of the controller sequence switch from its normal position to position 1 under the control of its special controlling contact 790 where the operation of the district selector takes place: battery 872, back left contact of relay 833, front left contact of relay 837, wire 873, wire 749, lower sequence switch contact 742, wire 750 through clutch 112 and stop magnet 114 of sequence switch 113 to ground. The circuit is now in readiness for the district, office division and office section selection but, before describing these functions, the operations of setting up the digits and station keys will be described.

In a sender circuit involving the operation of a plurality of recording and controlling devices by means of a single row of digits keys such for instance as are employed in this system, it becomes necessary to provide some automatic means for shifting the circuit of the keys to the proper controllers as the keys are depressed in the proper sequence. Such a device designated as the progression switch has been made use of in this circuit and is shown diagrammatically in Fig. 3, its function being to shift the energizing circuit from the keys to the various controllers as the thousands, hundreds, tens and units keys are depressed in proper sequence.

The plan of translation in this system is such that a ten thousand line office is divided into five main divisions of two thousand lines each and for this reason the wiring from the keys to the primary division controller contacts is arranged in pairs, i. e., keys 0 and 1 are connected to the first contact, 2 and 3 to the second, 4 and 5 to the third, etc.

Each of these main divisions of two thousand lines is again sub-divided into four secondary groups of five hundred lines each, the selection of which is dependent upon the position of the desired number in the main division of two thousand lines, i. e., whether it is in the first, second, third or fourth group of five hundred of the two thousand. This is determined by a combination of the thousands and hundreds keys operating in connection with the relays 540, 547, 550, 552, and the primary section controller. In connection with the thousands digit relay 550 is arranged to be operated by all of the odd keys, while the depression of an even key will allow relay 550 to remain in the unoperated position. It will thus be seen that the operation of the thousands key accomplishes two purposes; first, to set the division controller in accordance with the group of two thousand and second, to determine by the position of relay 550 whether the desired number is in the first or second thousand of the main division of two thousand.

In connection with the digit keys, relay 540 is arranged to be operated by keys 0 to 4 inclusive and relay 547 by keys 5 to 9 inclusive. The operation of either of these two relays serves, by means of their right back contacts, to cause the progression switch to operate to cut in the proper controllers, and by means of their right front contacts to operate the clutch magnets of the several controllers in proper sequence as is determined by the position of the progression switch.

In connection with the depression of the hundred key, any digit from 0 to 4 inclusive will allow the relay 552 to remain in its normal position, thus determining that the number is located in the first five hundred group of one thousand which was previously determined by the position of the relay 550. Any key from 5 to 9 inclusive will operate relay 552 by means of contact 591 of the 5 to 9 relay 547 and thus determines that the number is in the second five hundred of the group of one thousand. When this determination has been made, the primary section controller is displaced to the desired point at the same time the hundreds controller is displaced to a position determined by the hundred key.

Returning now to the circuit, it will be seen that the closure of sequence switch contact 521 at position 1 has caused the progression switch to take the first half of its first step through the following circuit: ground 543, sequence switch contact 521, conductor 544, back contact of relay 540, right back contact of relay 547, stepping magnet 559 of the progression switch to battery 560.

Assuming now that the line to be called is No. 2568, the first key to be depressed will be the thousands, i. e., key No. 2. This closes a circuit to a point on the primary division controller through the following path: from ground, contact 304, conductor 305, conductor 556, to contact terminal 557, thus determining that the desired number is located in the second division of two thousand. The depression of key No. 2 also completes a circuit from ground 301, contact 302, conductor 303, conductor 539, winding of relay 540, conductor 541, conductor 751 to battery through lower contact 730. This causes relay 540 to operate and by opening its back contact allows the progression switch to complete the second half of its first step, thus bringing the arm 561 in contact with the first contact terminal to which is connected the circuit of the operating clutch of the primary division controller. This allows current to flow from ground 543 to sequence switch contact 521, conductor 544, front contact of relay 540, conductor 548, arm 561 of the progression switch, contact terminal 1, conductor 562, stop pawl 64 and back contact 62 of the primary division controller, conductor 563, through clutch 11 to battery 564. This causes the primary division controller to be displaced until the brush attached to the arm 30 reaches the terminal 557 when a circuit is completed from ground 301 of key No. 2, through the stop magnet 37 of the primary division controller and contact 528 to battery 564, thus energizing the stop magnet 37 and opening the clutch circuit at 62. This removes the driving power from the controller and at the same time causes the stop pawl 64 to engage the ratchet teeth in such a manner that the controller is brought to rest two steps from its normal position. It should be noted that key No. 2, being an even digit, has not operated relay 550, thus determining that the number being called is located in the first one thousand of the main division of two thousand as determined above by the primary division controller.

Upon the release of the thousands key, relay 540 is deënergized, and at its back contact, closes a circuit from ground 543, through sequence switch contact 521, conductor 544, right back contact of relay 547, conductor 592, stepping magnet 559 of the progression switch to battery 560. This energizes the stepping magnet and causes the arm 561 to take the first half of the second step from normal.

Depressing key 5 for the hundred completes a circuit from ground, through contact 306, conductor 307, conductor 565, to the first contact on the hundred controller dial. At the same time a circuit is completed from ground, contact 308, conductor 309, conductor 566, relay 547, conductor 567, conductor 752, lower contact 730 to battery. This causes the operation of relay 547, and by opening the contact 546, allows the stepping magnet 559 to release and cause the progression switch to complete the second half of the second step to terminal No. 2. This furnishes a path from ground 543, sequence switch contact 521, conductor 544, back contact of relay 540, right front contact of relay 547, contact arm 561 of the progression switch, conductor 569, through the back contact 62 on the stop pawl 64 of the hundreds controller, conductor 570, through magnet 11 to battery. This causes the hundreds controller to be displaced until the brush, attached to the arm 30, reaches the first contact terminal, where a circuit is completed to ground through contact 306 at key No. 5, over conductor 565, through the stop magnet 37, conductor 571, lower contact 529', to battery. This causes the operation of the stop magnet 37 and brings the controller to rest at the desired point, one step from normal.

The operation of (5 to 9) relay 547, in connection with the displacement of the hundreds controller, also closes a circuit from ground at the off-normal contact 586 of the hundreds controller, conductor 587, left contact of relay 547, conductor 593, contact of relay 552, winding of relay 552, to battery 595. This operates relay 552 and locks it through a circuit from battery 595, winding of relay 552, contact 596¹, resistance 597¹, sequence switch contact 598 to ground. This wets the second terminal on the primary section controller and in connection with the non-operation of relay 550 determines that the desired number is located in the second five hundred of the division of the thousand.

When the hundreds controller clutch is energized, current also flows from conductor 569 to conductor 596, contact 62 of stop pawl 64 on the primary section controller, conductor 597, clutch 11, to battery, thus displacing the controller arms two steps to the second contact terminal as determined by the relays 550 and 552.

The release of the hundreds key allows relay 547 to release, and by its back contact causes the progression switch to take the first half of its third step in preparation for the depression of the tens key. Depressing the tens key (No. 6) provides a path from ground 310, contact 311, conductor 312, conductor 572, conductor 602 to the seventh contact terminal of the tens controller. At the same time another path from ground 310 is furnished, through contact 313 of key No. 6, conductor 309, conductor 566, relay 547, conductor 567, conductor 752, lower contact 730 to battery. This causes the operation of relay 547 and allows the progression switch to complete the last half of the third step to contact terminal No. 3. At this point a path is completed from ground 543, sequence switch contact 521, back contact of relay 540, right front contact of relay 547, to the arm 561 of the progression switch, conductor 573, conductor 603, through contact 62 of the stop pawl 64 on the tens controller, conductor 604, and clutch 11 to battery. This causes the displacement of the tens controller to the seventh contact terminal where a path to ground 310 at key No. 6 is furnished over conductor 602, the brush attached to the arm 30, conductor 605, stop magnet 37, conductor, 606, sequence switch contact 607 to battery 608. This causes the stop magnet 37 to operate and stop the forward movement of the controller on the seventh contact terminal as determined by key No. 6. Upon the release of the tens key, the progression switch is advanced in preparation for the units key as described in the case of the thousands and hundreds keys.

Depressing the units key No. 8 furnishes a path from ground 314, contact 315, conductor 316, conductor 573¹, conductor 609 to terminal No. 8 of the units controller. The depression of this key also completes a path from ground 314, contact 317, conductor 309, conductor 566, relay 547, conductor 567, conductor 752, lower contact 730 to battery. This energizes relay 547 and allows the progression switch to take the last half of the fourth step for the displacement of the units controller. The closure of right front contact of relay 547 completes the path from ground 543, sequence switch contact 521, back contact of relay 540, right front contact of relay 547, the arm 561 of the progression switch, the fourth contact terminal, conductor 574, conductor 610, the back contact 62 of stop pawl 64 on the units controller, conductor 611 and clutch 11 to battery. This causes the displacement of the units controller nine steps to the ninth contact, as determined by the depression of key No. 8.

Returning to that point of operation at which the office key was released, it will be remembered that circuits were completed to drive sequence switch 113 out of position 0 and into position 1.

At position 1 of sequence switch 113 district selection takes place and, in order to prepare the district selector for operation, said sequence switch in passing from 0 to 1 sends an impulse to the district selector sequence switch over the following circuit: battery, left front contact of relay 823, conductor 874, conductor 753, contact 743, conductor 754, conductor 875, brush 815 of the cord finder, and its contact 810, lead 804, lead 904, conductor 935, clutch 919 and stop magnet 920 of the district selector sequence switch 918. This causes the sequence switch to move from position 1 to position 2. At this point, if the selector brushes 89, 90 and 91 are at rest in their normal position and the master driving mechanism is free and at its normal position, current will flow from battery 944, stop magnet contact 50, conductor 945, conductor 946, off normal contact 943, conductor 947, sequence switch contact 937, conductor 935, clutch 919 and stop magnet 920 of sequence switch 918. This drives the district selector sequence switch from position 2 to position 3 where it is stopped by the opening of contact 937.

At position 3 of the sequence switch 918, the following circuits are closed: battery 974; contact 973; wire 976; release magnet 81, and lower contact 968 to ground. Battery 972, lower contact 982, and individual driving clutch 73 to ground. By means of the first circuit magnet 81 is energized, and withdraws the holding clutch from engagement with ratchet-teeth 79 on the shaft 76. The latter circuit energizes the driving clutch 73 to couple the shaft 76 to the master driving shaft 29.

The district selector being in readiness for selection, a circuit is now completed from ground, through the stop magnet 43 of the master selector, conductor 952, brushes 35 and 36 on the interrupter 33, conductor 948, sequence switch contact 949, lead 902, lead 802, contact terminal and brush of the cord finder, conductor 876, contact 830 of relay 823, conductor 877, right contact of relay 837, conductor 878, conductor 755, conductor 577, conductor 438, lower sequence switch contact 427, conductor 454, lower winding of controller stepping magnet 38 to battery. This energizes the magnet 38, allowing the controller arm 30 to take the first half step toward its normal position, and at the same time energizes the district selector stop magnet 43, withdrawing the stop pawl 42 from engagement with the arm 40. Stop pawl 42 closes the contact 47, allowing current to flow from battery 944, contact 47, conductor 953 through the coil of master driving clutch 13 to ground. This causes the shaft 29 to revolve and when one half revolution has been made the insulated portion 15 of commutator 33 is brought underneath the brushes 35 and 36, thus breaking the above described selecting circuit. At this point, however, the stop pawl 42 is resting upon the raised portion of the stop wheel 39 so that contact 47 is not allowed to open when the stop magnet 43 is deënergized owing to the opening of the selecting circuit on the commutator 33. When the commutator 33 opens the above described selecting circuit, the stepping magnet 38 is deënergized, releasing the escapement 51 and allowing the brush carrying member 30 of the district selector to complete the second half of the first step in its travel back to normal. As the terminals to be selected are located in the second group, two steps will be required to satisfy the displaced district controller; therefore, the rotation of the shaft 29 continues until the circuit is again closed through the brushes 35 and 36 by the metallic part of the commutator 33. When this occurs, the stop magnet 43 is again energized, withdrawing the pawl 42 from the high part of the stop wheel 40 and continuing the energization of the master driving clutch 13 in order that the shaft 29 may be allowed to make another complete revolution. When the selecting circuit is closed the second time through the brushes 35 and 36 on the commutator 33, the district controller stepping magnet 38 is again energized, withdrawing the escapement 51 from the ratchet teeth on the movable member 30 and allowing the latter to take the first half of its last step toward normal. The rotation of the master driving shaft 29 continuing as above described in due time again opens the selecting circuit at the brushes 35 and 36 on the commutator 33 and allows the controller stepping magnet 38 to be released in order that the controller may complete the second half of the last step toward its normal position. At the normal position the local contact 61 is opened, deënergizing the stop relay 837 which opens at its right contact the shunt around the resistance 861 located in the selecting circuit.

Returning to the district selector, it will be seen that when the selecting circuit is opened at relay 837, as above described, the stop magnet 43 will not receive current through the brushes 35 and 36 when they are electrically connected as the shaft 29 approaches the end of the second revolution. About thirty degrees from the end of the travel of the stop wheel 39 the stop pawl runs off of the high portion of the wheel 39 and falls in the depression under the arm 40. This opens the master clutch circuit at the contact 47 and removes the driving power from the shaft 29. The moving parts, however, have acquired a sufficient amount of momentum to carry the shaft 29 safely into its normal position. At this point the stop pawl 42 strikes the arm 40 and the moving parts are brought to rest. When the stop magnet 43 is released, contact 50 is closed and current flows from battery 944, contact 50, conductor 945, contact 954, conductor 935, clutch 919 and stop magnet 920 of the district selector sequence switch 918. This drives the district selector sequence switch into position 4.

The district selector switch operates in a manner similar to that disclosed in Patent No. 1,020,185, hereinbefore referred to, and Patent to E. B. Craft, No. 1,117,553.

As sequence switch 918 leaves position 3, contact 949 is opened and the master mechanism is released and left in readiness to be picked up by any other individual district selector. At position 4 the testing relay 955 is connected to the test brush 91 through the following circuit: ground 962, contact 958, relay 955, conductor 959, test brushes 91, test terminal 87, conductor 922, resistance 960 to battery 961.

Assuming that the resistance 960 is not shunted by any other calling selector, the test relay 955 will be energized. When this occurs, current will flow from battery 956, through sequence switch contact 957, front contact of test relay 955, conductor 964, conductor 935, clutch 919 and stop magnet 920 of district selector sequence switch 918. This will cause sequence switch 918 to move from position 4 to position 5. The call may now pass on to other selectors of a similar design which will operate in their proper sequence, substantially as above described, for the district selector.

Assuming that the resistance 960, attached to the wire 922 on the first test terminal selected, which in this case is terminal 87, is busy, and therefore has a low resistance shunt connected to it, relay 955 will not be energized and the brushes 89, 90 and 91 will be allowed to pass on to the next set of terminals, a circuit being completed from battery 956, through sequence switch contact 957, back contact of relay 955, conductor 971, holding magnet 81, sequence switch contact 968, to ground, at the interrupter 967. When the interrupter 967 closes this circuit, the holding magnet 81 is energized, withdrawing the holding pawl 80 from the ratchet teeth 79. This releases the sleeve 76, and the weight of the brush carrier 88 causes the brushes to drop to the next lower set of terminals where another test is made. If this test terminal is also busy, the circuit through magnet 81 will be again completed by the interrupter, and the next lower set of terminals will be tested. This process will be repeated until a test terminal is found having full battery potential, which will energize the testing relay 955 and stop the hunting movement of the brushes as described in the first case.

Returning to the sender circuit it will be noted that when the district controller completed the second half of its last step, and opened the contact 61 to release the stop relay 837, the latter closed the following circuit to drive sequence switch 113 from its first to its second position, where the office division selection occurs: battery 872, left armature and back contact of relay 833, conductor 888, left back contact of relay 837, conductor 879, conductor 756, upper sequence switch contact 742, conductor 750, clutch 112, and stop magnet 114 of controller sequence switch 113. As the controller sequence switch 113 moves from position 1 to position 2, lower contacts 427 and 429 are opened and upper contacts 427 and 429 are closed, thus releasing the district controller from the selecting circuit, and substituting the office division controller. Upper contact 429 is arranged to be made early in the movement from position 1 to position 2, so that stop relay 837 will be energized to prevent the controller sequence switch moving more than one position. This occurs over a path from battery 862, relay 837, conductor 870, conductor 601, conductor 530, conductor 442, upper sequence switch contact 429 to ground at the off-normal contact $61^I$ of the office division controller. A selecting circuit, similar to that described in the case of the district selector, is now completed to the stepping magnet of the office division selector. This circuit may be traced as follows: Battery 444 at the office division controller, lower winding of the stepping magnet $38^I$, upper sequence switch contact 427, conductor 438, conductor 577, conductor 755, conductor 878, right contact of stop relay 837, conductor 877, contact 830 of relay 823, conductor 876, cord finder brush 813, contact terminal 808, lead 802, lead 902, upper contact 950, conductor 967, brush 90, terminal 86, wire 921, through the commutator stop magnet of the office selector to ground, in a similar manner to that described in the case of the district selector. The main driving shaft carrying the commutator on the office selector, now begins to rotate, opening the selecting circuit once for each revolution, and thereby causing the stepping magnet $38^I$ of the office division controller to be released and energized in order to allow the escape pawl 51 to step the movable member 30 back to its normal position. When a sufficient number of impulses have been received to accomplish this result, the off-normal contact $61^I$ will be opened to release the stop relay 837, as before. When this occurs the right contact of relay 837 is opened, removing the shunt from the high resistance 861 in the selecting circuit. This stops the forward movement of the distant office selector and allows the brushes to come to rest at the bottom of the main group of terminals in which it is desired to select an idle trunk.

The office selectors in this system, consist of machines having five hundred terminals divided into five main divisions of one hundred terminals each, these main divisions being again subdivided into ten groups of ten terminals each. In order to select a trunk it is necessary to advance the brushes to the top of the subsidiary group in which the desired trunk line is located, and it is for this purpose that the office section controller is provided.

When the stop relay 837 is released by the return of the office division controller to its normal position, the controller sequence switch 113 is moved from position 2 to position 3 for the office section selection, over a circuit from battery 872, back left contact of relay 833, conductor 888, back left contact of relay 837, conductor 879, conductor 756, upper sequence switch contact 742, conductor 750, clutch 112 and stop magnet 114 of sequence switch 113, to ground. In passing from position 2 to position 3, upper contacts 427 and 429 are opened and contacts 430 and 424 are closed, withdrawing the office division controller from the selecting circuit and substituting the office section controller. The off-normal contact 61" of the office section controller now completes a circuit from ground, through conductor 448, sequence switch contact 424, conductor 442, conductor 530, conductor 601, conductor 870, and relay 837, to battery 862. The operation of stop relay 837 stops the forward movement of the sequence switch 113, and by means of contact 840 closes the shunt around the high resistance 861 in the selecting circuit.

In the meantime, conditions will have been changed at the distant office selector, so that when the selecting circuit is completed for a third time, the brushes will be advanced over the secondary groups or sections at a relatively low rate of speed. (See Patent No. 1,020,185 above referred to). The change however, is of such a nature that the rate of sending impulses back to the sending mechanism remains the same. The selecting circuit from the office section controller is now complete through the following path: battery 449, lower winding of the office section controller 38", sequence switch contact 430, conductor 438, conductor 878, right contact of relay 837, conductor 877, contact 830 of relay 823, brush 813 of the cord finder, contact terminal 808, lead 802, lead 902, upper contact 950, conductor 967, brush 90, contact terminal 86, conductor 921, through the commutator and stop magnet of the office selector to ground.

The further advance of the office selector, in a similar manner to that previously described, now sends back impulses to the office section controller, and when the latter has received a sufficient number of impulses, as determined by the position to which it was displaced by the depression of the office key (in this case four steps), the off-normal contact 61" opens the previously described circuit through the stop relay 837. The shunt around the high resistance 861 in the selecting circuit is now opened at the right contact of relay 837. This deënergizes the office selector stop magnet and brings the selector to rest with the brushes resting at the top set of terminals of the group selected. The office selector mechanism now starts hunting and when a free set of terminals is reached, the selecting circuit is continued on over a trunk into a primary or group selector at a distant office.

In the meantime the stop relay 837 has closed a circuit from battery 872, through left contact of relay 833, conductor 888, left back contact of relay 837, conductor 879, conductor 756, upper contact 742, conductor 750, clutch 112 and stop magnet 114 of sequence switch 113 to ground. This causes the controller sequence switch 113 to take one step from position three to position four, at which point the circuit is ready for primary division selection.

Up to this point, the selectors under control of the sender may have been located in the same office with the sender and it has, therefore, been possible to control selection by means of a local circuit. From now on, however, the selection will take place over a trunk circuit to a distant office, and it is, therefore, necessary to relay the stepping magnets of the various controllers. For this reason, at position 4 of sequence switch 113, the stepping relay 841 is introduced into the selecting circuit by means of the following path: from battery 756, sequence switch contact 739, conductor 757, conductor 880, stepping relay 841, conductor 878, right contact of relay 837, conductor 877, contact 830 of relay 823, conductor 876, brush 813, contact terminal 808 of the cord finder, lead 802, lead 902, upper contact 950, conductor 967, brush 90, terminal 86, conductor 921, through the contact brushes of the office selector over the trunk to the distant office, through the line relay at the distant office and back over the other side of the line through contacts 965 and 969 to ground 968.

When the keys are depressed the operation of the sending circuit up to this point takes place immediately upon the release of the office key and the associated relay 432. The call, however, will not pass further than the operation of the district and office selectors until all of the keys have been depressed.

Assuming now that the digits keys have all been depressed in their proper order, it will be seen that when the units controller is displaced, there will be a circuit completed from ground at the off-normal contact 630, sequence switch contact 627, conductor 621, conductor 578, off-normal contact 579 of the primary division controller, sequence switch contact 503, conductor 530, conductor 601, conductor 870, relay 837 to battery. The operation of the stop relay 837 now moves the controller sequence switch 113 from position 4 to position 5 by means of a circuit previously described.

When sequence switch 113 moved from position 3 to position 4, contacts 430 and 424 opened to disconnect the office section controller from the selecting circuit and at position 5, contacts 522 and 503 are closed to connect the primary division controller to the selecting circuit. In passing from position 4 to position 5, contact 741 is momentarily closed, completing a circuit from battery through left front contact of relay 823, conductor 874, contact 741 and contact 722 to stop magnet 720 and clutch 719 of cord finder shifter switch 718 to ground. This moves switch 718 to 0 position, thus placing the circuits in such a condition that cord finder No. 2 will be associated with the cord next selected.

In this system, the primary group selector is composed of 500 sets of terminals divided into five main divisions of 100 terminals each. Each of these main divisions is again subdivided into four secondary groups of 25 lines each. The terminals of these latter groups are connected to the circuits of the final connectors.

The completion of the selecting circuit through the controlling means at the primary or group selector, as previously described, now operates the stepping relay 841, the latter receiving and relaying impulses to the controller stepping magnets as the selector advances. When stepping relay 841 operates, a circuit is completed from ground, through the contact of relay 841, conductor 883, conductor 622, conductor 579', sequence switch contact 522, lower winding of the primary division controller stepping magnet 580 to battery 581. This causes the operation of magnet 580 and allows the primary division controller arm 30 to take the first half of its first step toward its normal position. As the distant primary selector advances, stepping relay 841 is released and the above described circuit is opened, allowing the stepping magnet 580 of the primary division controller to complete the second half of its first step toward its normal position. This operation is continued as described until a sufficient number of impulses have been received by the primary division controller to restore it to its normal position. At this point, off-normal contact 579 opens to release stop relay 837 which introduces the high resistance 861 into the selecting circuit and stops the forward movement of the primary selector at the bottom of the main division in which the desired line is located. The release of stop relay 837 closes its back left contact and causes the controller sequence switch 113 to move from position 5 to position 6 over the previously described circuit.

At position 6 the primary section selection takes place, sequence switch contacts 522 and 503 being opened to disconnect the primary division controller from the selecting circuit and upper contacts 524 and 526 being closed to connect the primary section controller to the selecting circuit.

In the meantime, conditions have been changed at the distant primary selector, so that when the selecting circuit is closed for the primary section selection, the brushes will be advanced over the secondary groups or sections at a relatively low rate of speed, the change, however, being of such a nature that the rate of sending impulses back to the sending mechanism remains the same. A circuit is now completed from ground at the off-normal contact 585 of the primary section controller, conductor 582, upper contact 526, conductor 530, conductor 601, conductor 870, and stop relay 837 to battery 862. When stop relay 837 operates, its right contact closes the selecting circuit around resistance 861, through stepping relay 841 and the selection controlling means of the primary selector over the previously described selecting circuit. The primary selector now advances over the secondary groups and the impulses, received by the stepping relay 841, are relayed to stepping magnet 583 of the primary section controller over a circuit from ground, through the contact of stepping relay 841, conductor 883, conductor 622, conductor 579', upper contact 524, lower winding of stepping magnet 583, to battery 584. As in the case of the other controllers, previously described, when a sufficient number of impulses have been received by the primary section controller to restore it to its normal position, off-normal contact 585 is opened, thus breaking the previously traced circuit through the stop relay 837. The release of the stop relay 837 opens the shunt around the resistance 861 in the selecting circuit, and stops the advance of the distant primary selector at the top of the secondary group in which the terminals of the desired final connector are located. As in the case of the district and office selectors the primary selector now hunts for and selects a set of terminals associated with an idle connector in which the desired line terminates.

At the sender, when the stop relay 837 is released, it closes by means of contact 838 the previously traced circuit to the magnets 112 and 114, causing sequence switch 113 to move from position 6 to position 7 for the hundreds selection.

When switch 113 moves from position 6 to position 7, upper contacts 524 and 526 are opened to release the primary section controller from the selecting circuit and lower contacts 524 and 526 are closed to substitute the hundreds controller. At position 7, the off-normal contact 586 of the hundreds controller completes a circuit from ground, through off-normal contact 586, conductor 587, lower contact 526, conductor 530, conductor 601, conductor 870, relay 837, to battery 862. Relay 837 is energized, closing by means of its right contact the shunt around the high resistance 861 in the selecting circuit, which is now completed through stepping relay 841 and over the trunk through the controlling mechanism of the final connector.

This machine is similar in design to the office selector and the primary selector, having five hundred terminals, divided into five main groups of one hundred terminals each, for the hundreds selection. The hundreds are again sub-divided into ten sec-groups of ten terminals each for the tens selection, the ten terminals of each of these secondary groups forming the terminals of the separate lines for the units selection. As the final connector is now advanced over the main division of the hundreds selection, the impulses received by stepping relay 841 are relayed to the stepping magnet of the hundreds controller over a circuit from ground, through contact of relay 841, conductor 883, conductor 622, conductor 579', lower contact 524, conductor 590, winding of the stepping magnet 588 to battery. When a sufficient number of impulses have been received by the hundreds controller, in its travel back to normal position, the off-normal contact 586 is opened and relay 837 is deënergized. The opening of the right contact of relay 837 stops the advance of the distant final connector by the introduction of the high resistance 861 into the selecting circuit. As in the case of both the office and primary selectors, the brushes of the final connector are now brought to rest at the bottom of the main group of one hundred terminals in which the desired line is located.

When stop relay 837 is released, it closes, by means of its left back contact, the previously described circuit to the operating magnets of sequence switch 113, causing said switch to advance from position 7 to position 8 for tens selection. In passing from position 7 to position 8, lower contacts 524 and 526 are opened to release the hundreds controller from the selecting circuit and upper contacts 623 and 624 are closed to substitute the tens controller. When this change takes place, the circuit is completed from ground at the off-normal contact 626 of the tens controller to conductor 627, upper contact 624, conductor 601, conductor 870, relay 837 to battery 862. This energizes relay 837 which at its right contact closes the shunt around the resistance 861 in the selecting circuit which now extends through the stepping relay 841 to the controlling mechanism at the distant final connector.

In the meantime, a change has occurred at the final connector, so that when the selecting circuit is thus completed for the tens selection, the brushes will be advanced over the secondary groups of terminals at relatively low rate of speed, the change, however, being of such a nature that the rate of sending impulses back to the sender remains the same. The final connector now advances for the tens selection, and as the impulses are received by the stepping relay 841, the following circuit to the stepping magnet of the tens controller is completed: ground, contact of relay 841, conductor 883, conductor 628, upper contact 623, winding of the stepping magnet 629 of the tens controller to battery.

When a sufficient number of impulses have been received by the tens controller to restore it to its normal position, the off-normal contact 626 is opened and the stop relay 837 is released, completing at its left back contact the previously described circuit to the controller sequence switch 113, causing said switch to advance from position 8 to position 9, for the units selection.

As sequence switch 113 passes from position 8 to position 9, upper contacts 623 and 624 are opened to disconnect the tens controller from the selecting circuit and the lower contacts 623 and 624 are closed to substitute the units controller. In the meantime, the brushes at the distant connector have been resting at the top of the group of tens terminals in which the desired line is located. The circuit conditions have been altered so that when the units selection takes place, it will be by means of the step by step selection in much the same manner as the hunting took place as previously described in the district selector. The arrangement of the circuit is such, however, that as the brushes pass over each set of terminals, an impulse is sent back from the connector to the sending mechanism, these impulses being relayed to the units controller, so that it may take corresponding steps in its travel back to its normal position.

Returning to the sender, we now find the circuit completed from ground, through the off-normal contact 630 of the units controller, conductor 634, lower contact 624, conductor 635, conductor 601, conductor 870, and stop relay 837 to battery 862. This energizes relay 837, which by means of its right contact closes the selecting circuit to the stepping relay 841, and the controlling mechanism of the distant final connector. The brushes of the final connector now start downwardly in the act of selecting the desired line and the impulses received by the stepping relay 841 of the sender are relayed to the stepping magnet 631 of the units controller through the following circuit: ground, contact of relay 841, conductor 883, conductor 628, lower contact 623, conductor 633 and winding of the units controller stepping magnet 631 to battery 632. When a sufficient number of impulses have been received by the units controller, to cause it to reach its normal position, off-normal contact 630 is opened and stop relay 837 releases to stop the movement of the distant connector on the terminals of the desired line.

At the end of the units selection, the controller sequence switch 113 would move from position 9 through positions 10, 11 and 12, into its zero or normal position. This operation takes place by means of a circuit from battery 872, left contact of relay 833, left back contact of relay 837, conductor 879, wire 756, upper contact 742, conductor 750, clutch 112 and stop magnet 114 of the sequence switch 113, when sequence switch 113 went into its 9th position. As the sequence switch 113 moves from position 9 to position 10, it sends a momentary impulse to the district selector sequence switch 918 over the following circuit: battery 832, left front contact of relay 823, conductor 874, conductor 753, contact 743, conductor 754, conductor 875, brush 815 and contact terminal 810 of the cord finder, lead 804, lead 904, conductor 935, clutch 919 and stop magnet 920 of district selector sequence switch 918. This moves the sequence switch 918 from position 5 to position 6. In passing from position 5 to position 6, lower contact 939 is opened and the upper contact 939 is momentarily closed, in order to effect the revertive test. Owing to the fact that the call being described is one to a distant office, relay 856 has not been operated and the revertive test has no effect.

Immediately following the revertive test impulse from sequence switch contact 743 of the controller, a second impulse is sent over the same path by means of contact 743, as the controller sequence switch continues in its movement from position 10 to position 11. This impulse passing over the previously described circuit serves to advance the sequence switch 918 from position 6 to position 7 for talking. At position 7 contact 940 opens to release the sending mechanism by opening the holding circuit of relay 823 and contact 966 is closed to complete the talking circuit through the brushes of the various selectors to the called line. Ringing current will now be automatically applied to the called subscriber's line and, upon the response of the called subscriber, relay 909 is energized extinguishing lamp 933, thus indicating to the operator that the called subscriber has responded.

Returning now to the sender, contact 744 opens as the controller sequence switch reaches position 12, thus opening the circuit from ground 758, through conductor 759, conductor 885, left winding of relay 818 to battery 886. This releases relay 818, which frees the cord finder and the sender mechanism from the district selector with which it has been in operation. Relay 823, upon deënergization, completes a circuit from grounded battery 832, left-hand armature and back contact of relay 823, conductor 887, conductor 760, contact 745, conductor 731, winding of power magnet 525 to ground, thus causing the restoration of the progression switch. This circuit is opened at contact 745 when sequence switch 113 leaves position 12. The controller sequence switch 113 now passes on to its zero position and all parts are restored to their normal or rest condition.

It may be here noted that if the operator desires to return the controllers to normal position before the sending operation is completed, she withdraws the plug from the jack thereby deënergizing relay 907 which in falling back breaks at its right front contact the holding circuit for relay 823. A circuit now extends from battery, through interrupter 455 to conductor 456, thence through all the controller stepping magnets in parallel to conductor 457, conductor 598, sequence switch contact 761 and the right back contact of relay 823 to ground. When sequence switch 113 returns to its normal position this circuit is opened at contact 761.

Had the call been a local call, that is, had the called subscriber been at the same office as the calling, local office key 402, Fig. 2, would have been depressed. Unless the call was revertive, that is, the calling and called parties were both on the same party line, the operation would be in every way similar to that which occurred when the trunk office key was depressed with the single addition that relay 856 would have been energized from battery, through left front contact of relay 823 and sequence switch contact 725 to ground at key 402 when said key was operated. Relay 856 is operated upon a local call in order to complete at its right front contact a circuit for relay 853 which is closed at upper contact 939 for the revertive test. In this case relay 853 will be operated when the revertive test takes place but its operation will be without effect for reasons which will presently appear.

Had the calling party desired another party on the same party line, the operator not noticing this fact would have set up the call on the keyboard in the usual manner, which call would have progressed in exactly the same manner as before until the final connector had arrived on the contacts of the line, following which upper sequence switch contact 939 is closed for the revertive test. When sequence switch 918 passes from position 5 to position 6, relay 853 would be operated from battery, through relay 917, sleeve of the jack and plug, conductor 924, contact 939, conductor 901, conductor 801, the outermost contact and brush of the cord finder, armature and front contact of relay 856, relay 853 to ground through contact 734. Relay 853 completes a circuit from battery, through contact of relay 853, relay 833, right front contact of relay 856 and outermost brush and contact of the cord finder, conductor 801, conductor 901, sequence switch contact 939 to the sleeve of the calling subscriber's answering jack. In the case of a revertive call the test brush 980 of the connector will be connected to said sleeve through one of the multiple test terminals of the calling line and a low resistance path will be provided to ground through a relay 981, thus allowing relay 833 to be energized. In the case of a local call not revertive, relay 856 would become energized over the revertive test circuit, but relay 833 would not be operated on account of the resistance of relay 853 in its circuit.

The revertive test and the energization of relay 833 will occur when a revertive call takes place, while sequence switch 113 is in position 10 and sequence switch 918 is passing from position 5 to position 6. The attraction of the left armature of relay 833 interrupts the previously traced circuit to clutch magnet 112 and stop magnet 114 of sequence switch 113, thus stopping sequence switch in position 10. The attraction of the right armature of relay 833 completes a circuit from battery, through left winding of relay 823, conductor 869, contact 868, conductor 867, middle brush and contact of the cord finder, conductor 803, conductor 903, contact 940, lamp 942, right front contact of relay 907, back contact of relay 912, to battery. This increases the voltage through lamp 942 causing it to glow and indicating to the operator that the call is revertive. The operator would now remove the answering plug and insert a special ringing plug to call the wanted subscriber.

At the end of the conversation, in a call not revertive, when either the calling or called subscriber replaces its receiver upon the hook, lamps 932 or 933 respectively, will be lighted, thus indicating to the operator that disconnection is desired. The operator will now remove the plug 910 from jack 911, breaking the circuit through relay 907, which deënergizes, thus completing a circuit from battery, through left back contact of relay 912, right back contact of relay 907, left winding of relay 912, and contact 930 to ground. Relay 912 is energized and completes a circuit from battery, through its left front contact, right winding, upper sequence switch contact 936, clutch magnet 919 and stop magnet 920 of sequence switch 918, to ground. This causes sequence switch 918 to move to zero or normal position, where it is stopped by the opening of upper contact 936. In zero position circuit is completed from battery, through upper contact 982, off-normal contact 975, holding magnet 81, and lower contact 968 to ground. This retracts the pawl 80 and allows the brushes of the district selector to return by gravity to their normal or lowermost position, when contact 982 will be opened, breaking the energizing circuit for magnet 81. If at any time during the operation of the sender mechanism as described, the operator had for any reason desired to take down the connection and restore the various mechanisms involved to their normal condition, she would withdraw the plug 910 from the answering jack 911, releasing relay 907, when the restoring operation would take place in a manner similar to that previously described.

What is claimed is:

1. In a telephone system, a sender comprising a plurality of controlling devices, a single set of digits keys, means responsive to the successive operation of keys of said set for causing said controlling devices to assume set positions corresponding to the keys depressed, and a series of mechanical switches governed in their operation by the subsequent movement of said controlling devices, the movement of said controlling devices being caused in turn by the operation of said mechanical switches.

2. In a telephone system, a sender comprising a plurality of controlling devices, a single set of digits keys, a progression switch for associating said set with successive controlling devices upon the repeated actuation of said key set, a series of mechanical switches governed in their operation by the subsequent movement of said controlling devices, and means to cause said subsequent movement of said controlling devices in response to operation of said mechanical switches.

3. In a telephone system, a sender comprising a plurality of controlling devices, a single set of digits keys, a progression switch, and means responsive to the actuation of a key for causing a controlling device to assume a set position corresponding to the key actuated for operating said progression switch to operatively associate said key set with the succeeding controlling device, a series of mechanical switches governed in their operations by the subsequent movement of said controlling devices and means to accomplish said subsequent movement of said controlling devices in response to operation of said mechanical switches.

4. In a telephone system, a sender comprising a series of controlling devices, a single set of digits keys, a progression switch, means whereby each time a key of said set is actuated, a controlling device will be caused to assume a set position corresponding to the key and said progression switch will be moved to shift said key set to operative relation to the succeeding controlling device, a series of mechanical switches governed in their operations by the subsequent movement of said controlling devices, and means to control said subsequent movement of said controlling devices in response to operation of said mechanical switches.

5. In a telephone system, an operator's sender comprising a plurality of controlling devices, a single set of digit keys, means responsive to the successive operations of keys of said set for causing said controlling devices to assume set positions corresponding to the keys depressed, a plurality of electromagnetic switches governed in their movements by the subsequent movement of said controlling devices, a contact device under the control of the operator, and means responsive to the actuation of said contact device prior to the completion of a sending operation for automatically returning all unused controlling devices to normal.

6. In a telephone system, subscribers' lines, connecting circuits, means for uniting a connecting circuit with a line, mechanical switches for extending said connecting circuits, a sender comprising a plurality of controlling devices, means for causing said devices to assume set positions, said switches being governed in their movements by the return movement of said devices, and means actuated if said connecting circuit is disassociated with said line prior to the completion of a sending operation for automatically returning the unused controlling devices to their normal positions.

7. In a telephone system, an exchange, an operator's position thereat, a plurality of connecting circuits at said position, a plurality of senders common to said connecting circuits, finder switches, one for each sender, for uniting said sender with a connecting circuit taken for use, an allotter and circuits controlled thereby for assigning in a definite order said finder switches for use in selecting connecting circuits successively taken for use, means for causing a desired sender to assume a set position, mechanical switches for extending a connecting circuit taken for use, and means for operating said sender in response to the movements of said mechanical switches.

8. In a telephone system, an exchange, an operator's position thereat, a plurality of connecting circuits at said position, a pair of senders common to said connecting circuits, finder switches, one for each sender for uniting its sender with a connecting circuit taken for use, an allotter and circuits controlled thereby for causing said finder switches to hunt alternately for connecting circuits successively taken for use, means for causing a desired sender to assume a set position, mechanical switches for extending a connecting circuit taken for use, and means for operating said sender in response to the movements of said mechanical switches.

In witness whereof the said MARION R. BULLARD, administratrix, and the said JOHN N. REYNOLDS hereunto subscribe their names on this 5th day of January, A. D. 1915.

MARION R. BULLARD,
*Administratrix of the estate of Albert M. Bullard, deceased.*

JOHN N. REYNOLDS.

Witnesses:
E. EDLER,
K. L. STAHL.